United States Patent [19]

Campau

[11] Patent Number: 4,589,441

[45] Date of Patent: May 20, 1986

[54] SYSTEM FOR CONTROLLING LIQUID FLOW

[76] Inventor: Daniel N. Campau, 656 Duxbury Ct., Grand Rapids, Mich. 49506

[21] Appl. No.: 629,310

[22] Filed: Jul. 10, 1984

[51] Int. Cl.$^4$ ............................................. F16K 15/18
[52] U.S. Cl. ................................ 137/512; 137/269.5; 137/614.18; 137/855
[58] Field of Search ................ 137/269.5, 614.17, 599, 137/493, 493.8, 493.9, 512, 512.1, 614.2, 625.47, 855, 614.18

[56] References Cited

U.S. PATENT DOCUMENTS

| | | | |
|---|---|---|---|
| 2,570,937 | 10/1951 | Gash | 137/493.8 |
| 3,011,468 | 12/1961 | O'Gara | 137/855 X |
| 3,474,818 | 10/1969 | Hartman | 137/269.5 X |
| 3,565,099 | 2/1971 | Huber | 137/269.5 |
| 3,628,565 | 12/1971 | McWethy | 137/855 |
| 4,304,259 | 12/1981 | Brunner | 137/599.1 |
| 4,529,003 | 7/1985 | Iannuzzelli | 137/512 X |

FOREIGN PATENT DOCUMENTS 2527748 1/1976 Fed. Rep. of Germany ...... 137/614

Primary Examiner—Martin P. Schwadron
Assistant Examiner—Stephen M. Hepperle
Attorney, Agent, or Firm—Niro, Scavone, Haller and Niro, Ltd.

[57] ABSTRACT

A system for controlling the flow of liquid between a reservoir and a liquid source. Passageways are provided between the reservoir and the source for the flow of liquid therebetween. Selectively operable valves, including automatic check valves, are disclosed in various forms of the invention for actuation between a first position for filling the reservoir with liquid from the source and a second position for emptying liquid from the reservoir to the source. The automatic valves prevent the flow of liquid from the reservoir to the source when in the first, filling position and allow the flow of liquid from the reservoir to the source when in the second, emptying position.

4 Claims, 4 Drawing Figures

SYSTEM FOR CONTROLLING LIQUID FLOW

BACKGROUND OF THE INVENTION

This invention relates to a system for controlling the flow of liquid between a reservoir, such as a livewell on a fishing boat, and a liquid source such as lake or river water.

In fishing vessels, such as a popular bass boat, livewells are provided wherein a manual valve is used to permit lake or river water to flow into the livewell until the tank level is equalized with the lake level. Normally the livewell is filled while the boat is stationary in the water. If an operator fails to close the manual valve when the boat moves off with any spped, the livewell becomes drained. This can be a serious problem if the livewell contains fish. It is desirable to be able to empty the livewell either by running the boat with the valve open or by pulling the boat out of the water and draining the livewell by gravity. It is necessary, however, that water can be retained in the livewell with the boat either moving or out of water.

Heretofore, the only available control means has been a manual valve as described above. Often an operator fails to close the manual valve. For instance, under the pressures of competition in fishing tournaments operators frequently fail to place the manual valve in the proper position, resulting in death of fish retained in the livewell. In many fishing tournaments this results in a serious penalty for the contestant. It would be desirable to provide a simple flow control system and valve arrangement which can safely, conveniently and inexpensively control livewell water filling and emptying cycles and preclude the accidental emptying of a livewell when a boat is moving or pulled out of the water. This invention is directed to providing such a system and thereby avoiding the problems described above.

SUMMARY OF THE INVENTION

An object, therefore, of the invention is to provide a new and improved system for controlling the flow of liquid between a reservoir and a liquid source.

Another object of the invention is to provide such a system which is simple and inexpensive for selectively filling the reservoir from a liquid source and for preventing accidental draining of the reservoir, such as a livewell on a fishing boat.

In the exemplary embodiment of the invention, the system includes conduit means between the reservoir and source for flow of liquid therebetween. Selectively operable valve means is provided in the conduit means for actuation between a first position for filling the reservoir with liquid from the source and a second position for emptying liquid from the reservoir to the source. Automatic check valve means are provided in the conduit means to prevent the flow of liquid from the reservoir to the source when the selectively operable valve means is in the first, filling position and to allow the flow of liquid from the reservoir to the source when the selectively operable valve means is in the second, emptying position. The check valve means prevents the back flow of liquid from the source to the reservoir when the selectively operable valve means is in the second, emptying position.

In one form of the invention, the conduit means include first and second passageways, a first check valve in the first passageway to allow liquid to flow only from the source to the reservoir, and a second check valve in the second passageway to allow liquid to flow only from the reservoir to the source. The selectively operable valve means is arranged to connect the first passageway to the source when in its first position and to connect the second passageway to the source when in its second position. The selectively operable valve means may be located at a common juncture between the first and second passageways.

In a second form of the invention, the automatic check valve means include means effective to allow the flow of liquid from the reservoir to the source when the selectively operable valve means is in its second, emptying position but only when the pressure on the source-side of the check valve means is less than the pressure on the reservoir-side of the check valve means.

More particularly, the conduit means in the second form of the invention includes a first passageway between the source and the reservoir, a valve seat in the first passageway, a diaphragm valve movable into closing and opening engagement with the valve seat, and a chamber behind the diaphragm valve. A second passageway effectively communicates between the source and the reservoir. The selectively operable valve means is disposed in the second passageway for connecting the chamber behind the diaphragm valve in communication either with the source or with the reservoir. Preferably, the second passageway is in communication with the first passageway on opposite sides of the valve seat and diaphragm valve.

In a third form of the invention, the conduit means comprises a passageway through a closed housing. The selectively operable valve means and the automatic check valve means comprise a unitary structure in the housing for both controlling the flow of liquid through the housing in either direction and for checking the flow of liquid in the respective opposite direction.

More particularly, in the third form of the invention an inlet is provided in the housing leading from the source, and an outlet is provided in the housing leading to the reservoir. A first, flexible check valve member is operatively associated with the inlet to permit the flow of liquid through the housing only from the source when the selectively operable valve means is in its first position. A second, flexible check valve member is operatively associated with the outlet to permit the flow of liquid through the housing only from the reservoir when the selectively operable valve means is in its second position. The inlet and outlet of the housing are disposed on diametrically opposite sides of the housing. The first and second check valve members are mounted on a common rotary member spaced less than 180° apart. Therefore, the check valve members provide unobstructed flow through the respective inlet and outlet when not in operative position relative thereto.

Other objects, features and advantages of the invention will be apparent from the following detailed description taken in connection with the accompanying drawings.

DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE INVENTION

Figure 1:
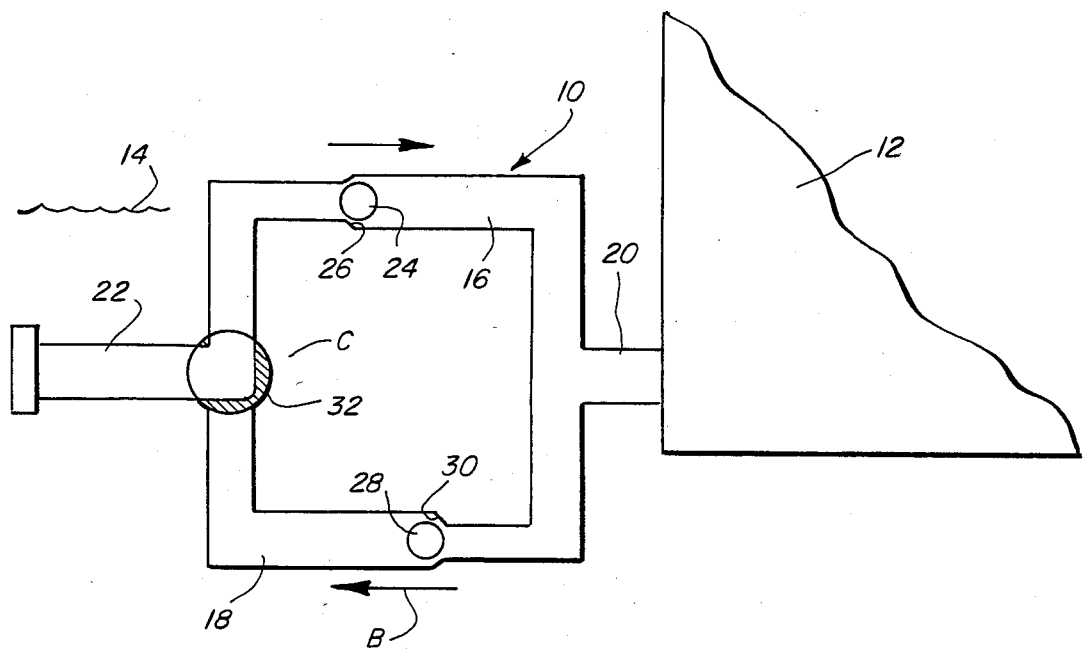
FIG. 1 is a somewhat schematic view of the first form of the invention, with the valve means in filling position.

Referring to the drawings in greater detail, three embodiments of the invention are illustrated in FIG. 1, FIG. 2 and FIGS. 3-4, respectively. The invention is directed to providing a system for controlling the flow of liquid between a reservoir and a liquid source. For instance, the system is readily applicable for use with fishing vessels which are provided with livewells. The livewells are filled with water from a lake or river under the natural pressure of the source until the livewell is filled to an equalized level. Therefore, throughout the following description the term "source" can be thought of as the lake or river water, and the term "reservoir" can be thought of as a livewell on a fishing boat. Of course, the invention has wide utility to control liquid flow in systems other than fishing boats and livewells.

A first embodiment of the invention is shown somewhat schematically in FIG. 1. Conduit means, generally designated 10, is provided between a reservoir 12, such as a boat livewell, and a source 14, such as lake or river water, for the flow of liquid therebetween. The conduit means include first and second passageways 16 and 18, respectively. The passageways are joined by a common conduit 20 leading to reservoir 12. An inlet pipe or conduit 22 connects the passageways for selective communication with source 14.

A first check valve in the form of a ball 24 is operatively associated with a valve seat 26 and allows liquid to flow through passageway 16 only from source 14 to reservoir 12, as indicated by arrow "A". A second check valve is in the form of a ball 28 and is operatively associated with a valve seat 30 to allow liquid to flow through second passageway 18 only from reservoir 12 to source 14, as indicated by arrow "B".

A selectively operable valve means, generally designated 32, is rotatably disposed at the common juncture between first passageway 16, second passageway 18 and inlet conduit 22. The selectively operable valve means is shown in FIG. 1 in a first position for filling reservoir 12 from source 14. It can be seen that the liquid can flow from the source under pressure through passageway 16 by automatically opening ball valve 24. However, the ball valve will prevent the reverse flow should an operator maintain the selectively operable valve means in its filling position, as shown, should the level of liquid at source 14 drop below the level of liquid in the reservoir.

The selectively operable valve means is rotatable in the direction of double-headed arrow "C" to an emptying position establishing communication between second passageway 18 and inlet conduit 22. Should the level of liquid at source 14 be at least as high as the level of liquid in reservoir 12, no flow of liquid through passageway 18 will be effected. However, should the liquid level at source 14 fall, such as moving a boat at high speed or by pulling the boat out water, the liquid in reservoir 12 will drain through passageway 18 as ball valve 28 opens, through selectively operable valve means 32 and out through inlet conduit 22. Backflow from the source is prevented by ball valve 28.

Figure 2:
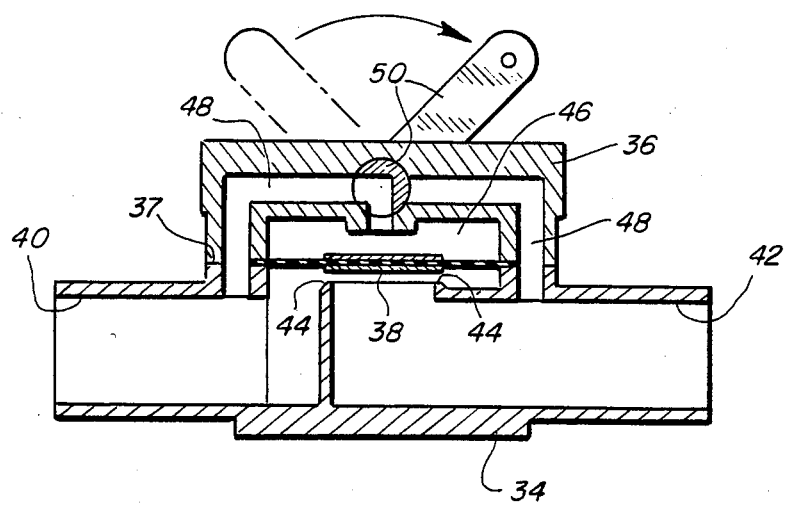
FIG. 2 is a section through a second form of the invention taken in the direction of liquid flow, with the valve means in its emptying position.

FIG. 2 shows a second embodiment of the invention wherein a housing is fabricated of a lower part 34 and an upper part 36 joined together at 37 to secure a diaphragm-type check valve member 38 therein.

More particularly, the housing includes an inlet 40 leading to source 14 and an outlet 42 leading to reservoir 12. The inlet and outlet are part of a first passageway extending through the housing between the source and the reservoir. A valve seat 44 is provided in the first passageway, and diaphragm valve 38 is movable into closing and opening engagement with the valve seat. Upper housing part 36 defines a valve chamber 46 behind diaphragm valve 38. A second passageway 48 extends through the housing around the diaphragm valve. it can be seen that the second passageway is in communication with the first passageway on opposite sides of the diaphragm valve to effectively communicate between the souce and the reservoir. A selectively operable valve means 50 is rotatably disposed in second passageways 48 and in operative association with a port 52 communicating with valve chamber 46. The selectively operable valve means is effective to establish communication between valve chamber 46 and either the source or reservoir side of the valve means.

FIG. 2 shows the system with selectively operable valve means 50 in its emptying position. Should there be a suction on the source-side of the valve (e.g. a suction created by a moving boat) or should there be a greater pressure on the reservoir side of the valve, diaphragm valve 38 simply would raise off of valve seat 44 and drain the reservoir. However, should the pressure reverse, the reservoir would not refill because of the greater area above diaphragm valve 38 than below the diaphragm valve around valve seat 44. In other words, the greater pressure would communicate through passageway 48 and manually operable valve means 50 into valve chamber 46 to force the diaphragm valve down and close against valve seat 44.

When manually operable valve means 50 is moved to its filling position as indicated in phantom in FIG. 2, the valve means establishes communication between the reservoir-side of the valve and valve chamber 46. In this condition, liquid from the source can lift diaphragm valve 38 to fill the reservoir until the liquid levels equalize. If the pressure on the source-side of the valve drops when in this condition, diaphragm valve 38 is forced downwardly to close the valve and retain liquid in the reservoir. This is true because the higher pressure on the reservoir-side of the valve communicates through passage 48 and selectively operable valve means 50 to valve chamber 46, i.e. the larger area side of diaphragm valve 38.

Figure 3:
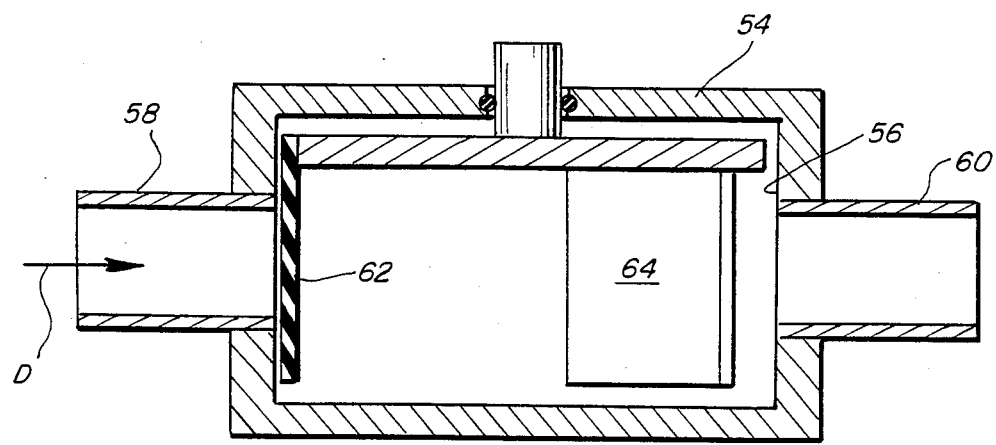
FIG. 3 is a section similar to that of FIG. 2 of a third form of the invention, with the valve means in position for filling the reservoir.
Figure 4:
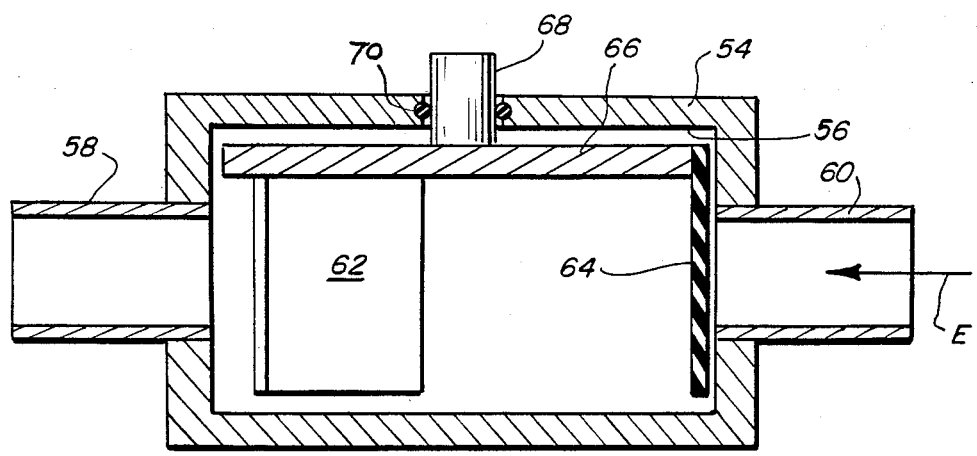
FIG. 4 is a section of the form of the invention shown in FIG. 3, with the valve means in position for draining the reservoir.

FIGS. 3 and 4 illustrate a third embodiment of the invention wherein the selectively operable valve means and the automatic check valve means comprise a unitary structure operable within a closed housing 54 defining an interior chamber 56, for controlling both the flow of liquid through the housing in either direction and for checking the flow of liquid in the respective opposite direction.

More particularly, the housing has an inlet 58 thereto from source 14 and an outlet 60 therefrom to reservoir 12. A first check valve member, in the form of a flexible flap 62, is operatively associated with inlet 58 to permit the flow of liquid in the direction of arrow "D" (FIG. 3) through the housing only from the source when the unitary valve means is in a first, filling position as shown in FIG. 3. A second valve member, in the form of a flexible flap 64, is operatively associated with outlet 60 to permit the flow of liquid in the direction of arrow "E" (FIG. 4) through the housing only from the reservoir when the selectively operable valve means is in a second, draining position as shown in FIG. 4. First and second check valve members 62 and 64, respectively, are mounted on a rotary member 66 manually operable through a valve shaft 68. A seal 70 is provided around the valve shaft. Inlet 58 and outlet 60 are disposed on diametrically opposite sides of the housing. It can be seen in FIGS. 3 and 4 that the first and second check valve members 62 and 64 are disposed on rotary members 66 less than 180° apart. In this manner, outlet 60 is totally unobstructed when the valve means is in the filling position as indicated in FIG. 3, and inlet 58 is totally unobstructed when the valve means is in the emptying position as shown in FIG. 4. This is important to prevent clogging of the valve. For instance, in fishing boat applications, relatively large particles of debris, such as leaves or the like, often are encountered. With this embodiment, the particles can readily pass through the valve and yet the valve checks tightly for reverse flow prevention because of the flexibility of valve members 62, 64.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A system for controlling the flow of liquid between a reservoir and a liquid source, comprising:
    conduit means between said reservoir and said source for the flow of liquid therebetween;
    selectively operable valve means in said conduit means for actuation between a first position for filling the reservoir with liquid from said source and a second position for emptying liquid from the reservoir to said source;
    automatic check valve means in said conduit means for preventing the flow of liquid from the reservoir to said source when said selectively operable valve means is in said first, filling position and for preventing the flow of liquid from said source to the reservoir when said selectively operable valve means is in said second, emptying position;
    said conduit means comprising a passageway through a housing, and said selectively operable valve means and said automatic check valve means comprising a unitary structure in said housing for controlling both the flow of liquid through the housing in either direction and for checking the flow of liquid in the respective opposite direction; and
    said housing having an inlet thereto from said source and an outlet therefrom to the reservoir, a first check valve member operatively associated with said inlet to permit the flow of liquid through the housing only from said source when said selectively operable valve means is in said first position, and a second check valve member operatively associated with said outlet to permit the flow of liquid through the housing only from said reservoir when said selectively operable valve means is in said second position.

2. The system of claim 1 wherein said first check valve member is arranged to be in an unobstructed position relative to said inlet when said selectively operable valve means is in said second position, and said second check valve member is arranged to be in an unobstructed position relative to said outlet when said selectively operable valve means is in said first position.

3. The system of claims 1 or 2 wherein said first and second check valve members are mounted on a common rotary member.

4. The system of claim 3 wherein said inlet and said outlet are disposed on diametrically opposite sides of said housing, and said first and second check valve members are disposed on said rotary member less than 180° apart.

* * * * *